(12) United States Patent
Huang

(10) Patent No.: US 9,964,819 B2
(45) Date of Patent: May 8, 2018

(54) LIQUID CRYSTAL DISPLAY PANEL

(71) Applicant: Shenzhen China Star Optoelectronics Technology Co., Ltd., Shenzhen (CN)

(72) Inventor: Shishuai Huang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 240 days.

(21) Appl. No.: 14/893,966

(22) PCT Filed: Aug. 20, 2015

(86) PCT No.: PCT/CN2015/087625
§ 371 (c)(1),
(2) Date: Nov. 25, 2015

(87) PCT Pub. No.: WO2017/028299
PCT Pub. Date: Feb. 23, 2017

(65) Prior Publication Data
US 2017/0052416 A1    Feb. 23, 2017

(30) Foreign Application Priority Data
Aug. 18, 2015  (CN) .......................... 2015 1 0507546

(51) Int. Cl.
*G02F 1/1333*  (2006.01)
*G02F 1/1345*  (2006.01)
*G02F 1/1362*  (2006.01)
*G02F 1/13*    (2006.01)

(52) U.S. Cl.
CPC .. *G02F 1/136204* (2013.01); *G02F 1/136286* (2013.01); *G02F 1/1309* (2013.01); *G02F 1/13452* (2013.01); *G02F 2001/136254* (2013.01)

(58) Field of Classification Search
CPC ............. G02F 1/136204; G02F 1/1309; G02F 1/13452; G02F 2001/136254
See application file for complete search history.

(56) References Cited

U.S. PATENT DOCUMENTS 6,088,073 A     7/2000  Hioki et al.
2003/0020845 A1* 1/2003  Lee ................... G02F 1/136204
                                                349/40
2004/0124869 A1* 7/2004  Lee ....................... G02F 1/1345
                                                324/750.3
(Continued)

FOREIGN PATENT DOCUMENTS

CN        1196547       10/1998
CN       201174016      12/2008
(Continued)

*Primary Examiner* — Wen-Ying P Chen

(57) ABSTRACT

A liquid crystal display panel is disclosed. The liquid crystal display panel comprises a testing region, which comprises testing lines. The testing lines comprise data short lines and scan short lines and a static-electron-protection circuit. The static-electron-protection circuit is disposed between the testing lines and the common welding lead wires. The static-electricity-protection circuit is used to release the static electrons generated on the data lines or the scan lines through the common lines, when static electrons during the liquid crystal display manufacturing process of the data lines or the scan lines are generated.

13 Claims, 3 Drawing Sheets

(56) References Cited

U.S. PATENT DOCUMENTS

2004/0222813 A1 11/2004 Kim et al.
2008/0266475 A1* 10/2008 Chang ............... G02F 1/136204
　　　　　　　　　　　　　　　　　　　　　349/40
2009/0085843 A1 4/2009 Hiromasu

FOREIGN PATENT DOCUMENTS

| CN | 101399274 | 4/2009 |
| CN | 202256947 | 5/2012 |

* cited by examiner

LIQUID CRYSTAL DISPLAY PANEL

RELATED APPLICATIONS

This application is a National Phase of PCT Patent Application No. PCT/CN2015/087625 having International filing date of Aug. 20, 2015, which claims the benefit fo priority of Chinese Patent Application No. 201510507546.0, filed on Aug. 18, 2015. The contents of the above applications are all incorporated by reference as if fully set forth herein in their entirety.

BACKGROUND OF THE INVENTION

Field of Invention

The present invention relates to a field of display technology, and in particular to a liquid crystal display panel.

Description of Prior Art

In a TFT-LCD (Thin-film-transistor liquid crystal display) panel manufacturing process, a glass substrate upon moving and transporting may rub machines or air to generate static electrons. When the static electrons on the glass substrates accumulate to a specific level, a great voltage difference is generated. The accumulated electrons have enough energy to leave an original position to neutralize with opposite-polarity electrons, for the electron movement is finished in a very short time. A great current is generated during the movement, causing the electrons to discharge, the discharge process has breaking effect and the position of the discharge process is hard to predict. If the discharge process happens at an overlap of the metal lines, the static electrons easily break through the metal lines, making the metal lines short circuit and malfunction, then, raising the manufacturing cost.

Hence, it is necessary to provide a liquid crystal display panel to solve the technical issue of the conventional art.

SUMMARY OF THE INVENTION

The purpose of the present invention is to provide a liquid crystal display panel to solve the technical issue of easily generating static electrons which break the metal lines during the liquid crystal display panel manufacturing process of the conventional art.

To solve the above technical issue, the present invention provides a liquid crystal display panel, which comprises:

A display region, used to perform image display, the display region comprises:

a plurality of data lines, used to input with data signals.

a plurality of scan lines, used to input with scan signals; and a plurality of common lines, used to input common signals;

a testing region, used to test the display region, the testing region comprises:

Transmitting lines, which comprise a plurality of data welding lead-wires, a plurality of scan welding lead-wires, a plurality of common welding lead-wires; the data welding lead-wires are used to transmit the data signals to the data lines, the scan welding lead-wires are used to transmit the scan signals to the scan lines, the common welding lead-wires are used to transmit the common signals to the scan lines;

Testing lines, which comprise data short lines and scan short lines, the data welding lead wires are connected with the data short lines, the scan welding lead wires are connected with the scan short lines;

A static-electron-protection circuit, being disposed between the testing lines and the common welding lead wires, the static-electricity-protection circuit is used to release the static electrons generated on the data lines or the scan lines through the common lines, when static electrons during the liquid crystal display manufacturing process of the data lines or the scan lines are generated.

The static-electricity-protection circuit comprises a first input terminal and a first output terminal, the first input terminal inputs the static electrons generated on the data lines or the scan lines, the first output terminal releases the static electrons generated on the data lines or the scan lines, the first input terminal connects with the testing lines, the first output terminal connects with the common welding common lead-wires.

When the static-electricity-protection circuit is disposed between the scan short lines and the common welding lead wires, at least one of the common welding lead-wires connects with the scan short lines through the static-electricity-protection circuit.

In the liquid crystal display panel of the present invention, the static-electricity-protection circuit comprises a first diode, a second diode, and a transistor.

The transistor comprises a second input terminal, a second output terminal, and a control terminal;

An anode of the first diode connects with the first input terminal, and a cathode of the first diode connects with a cathode of the second diode;

An anode of the second diode connects with the first output terminal;

The second input terminal of the transistor connects with the anode of the first diode; the second output terminal of the transistor connects with the anode of the second diode; the control terminal of the transistor connects with the cathode of the first diode.

In the liquid crystal display panel of the present invention, when the data lines or the scan lines accumulate positive static electrons, the positive static electrons are released to the common lines by the first diode.

In the liquid crystal display panel of the present invention, when the data lines or the scan lines accumulate negative static electrons, the positive static electrons are released to the common lines by the second diode.

In the liquid crystal display panel of the present invention, the scan welding lead-wires comprise a first scan welding lead-wire set and a second scan welding lead-wire set, the scan short lines comprise a first scan short line and a second scan short line.

The first scan welding lead-wire set is constituted by scan welding lead-wires of (2K) th columns, the scan welding lead-wires of (2K) th columns electrically connect with each other by the first scan short line.

The second scan welding lead-wire set is constituted by scan welding lead-wires of (2K+1) th columns, the scan welding lead-wires of (2K+1) th columns electrically connect with each other by the second scan short line, where K is a positive integer.

In the liquid crystal display panel of the present invention, the liquid crystal display panel comprises a plurality of pixel units which are restrictively constituted by the data lines and the scan lines, the pixel units comprise red pixel units, green pixel units, and blue pixel units.

The data welding lead-wires comprise a first data welding lead-wire set, a second data welding lead-wire set, and a third data welding lead-wire set; the data short lines comprise a first data short line, a second data short line and a third data short line.

The first data welding lead-wire set is constituted by data welding lead-wires which are connected with the red pixel units, all of the data welding lead-wires which are connected with the red pixel units electrically connect with each other by the first data short line.

The second data welding lead-wire set is constituted by data welding lead-wires which are connected with the green pixel units, all of the data welding lead-wires which are connected with the green pixel units electrically connect with each other by the second data short line.

The third data welding lead-wire set is constituted by data welding lead-wires which are connected with the blue pixel units, all of the data welding lead-wires which are connected with the blue pixel units electrically connect with each other by the third data short line.

In the liquid crystal display panel of the present invention, the pixel units further comprise white pixel units. The data short lines further comprise a fourth data short line; the data welding lead-wires further comprise a fourth data welding lead-wire set.

The fourth data welding lead-wire set is constituted by data welding lead-wires which are connected with the white pixel units, all of the data welding lead-wires which are connected with the white pixel units electrically connect with each other by the fourth data short line.

In the liquid crystal display panel of the present invention, when the static-electricity-protection circuit is disposed between the data short lines and the common welding lead wires, at least one of the common welding lead-wires connects with the data short lines through the static-electricity-protection circuit.

To solve the above technical issues, the present invention provides a liquid crystal display panel, which comprises:

A display region, used to perform image display, the display region comprises:

A plurality of data lines, used to input with data signals.

A plurality of scan lines, used to input with scan signals; and

A plurality of common lines, used to input common signals;

A testing region, used to test the display region, the testing region comprises:

Transmitting lines, which comprise a plurality of data welding lead-wires, a plurality of scan welding lead-wires, and a plurality of common welding lead-wires; the data welding lead-wires are used to transmit the data signals to the data lines, the scan welding lead-wires are used to transmit the scan signals to the scan lines, the common welding lead-wires are used to transmit the common signals to the scan lines;

Testing lines, which comprises data short lines and scan short lines, the data welding lead wires are connected with the data short lines, the scan welding lead wires are connected with the scan short lines;

A static-electron-protection circuit, being disposed between the testing lines and the common welding lead wires, the static-electricity-protection circuit is used to release the static electrons generated on the data lines or the scan lines through the common lines, when generating static electrons during the liquid crystal display manufacturing process of the data lines or the scan lines are generated.

In the liquid crystal display panel of the present invention, the static-electricity-protection circuit comprises a first input terminal and a first output terminal, the first input terminal inputs the static electrons generated on the data lines or the scan lines, the first output terminal releases the static electrons generated on the data lines or the scan lines, the first input terminal connects with the testing lines, the first output terminal connects with the common welding common lead-wires.

In the liquid crystal display panel of the present invention, the static-electricity-protection circuit comprises a first diode, a second diode, and a transistor.

The transistor comprises a second input terminal, a second output terminal, and a control terminal.

An anode of the first diode connects with the first input terminal, and a cathode of the first diode connects with a cathode of the second diode.

An anode of the second diode connects with the first output terminal.

The second input terminal of the transistor connects with the anode of the first diode, the second output terminal of the transistor connects with the anode of the second diode, and the control terminal of the transistor connects with the cathode of the first diode.

In the liquid crystal display panel of the present invention, when the data lines or the scan lines accumulate positive static electrons, the positive static electrons are released to the common lines by the first diode.

In the liquid crystal display panel of the present invention, when the data lines or the scan lines accumulate negative static electrons, the positive static electrons are released to the common lines by the second diode.

In the liquid crystal display panel of the present invention, the scan welding lead-wires comprise a first scan welding lead-wire set and a second scan welding lead-wire set, and the scan short lines comprise a first scan short line and a second scan short line.

The first scan welding lead-wire set is constituted by scan welding lead-wires of (2K) th columns, and the scan welding lead-wires of (2K) th columns electrically connect with each other by the first scan short line.

The second scan welding lead-wire set is constituted by scan welding lead-wires of (2K+1) th columns, and the scan welding lead-wires of (2K+1) th columns electrically connect with each other by the second scan short line, wherein K is positive integer.

In the liquid crystal display panel of the present invention, when the static-electricity-protection circuit is disposed between the scan short lines and the common welding lead wires, at least one of the common welding lead-wires connects with the scan short lines through the static-electricity-protection circuit.

In the liquid crystal display panel of the present invention, the liquid crystal display panel comprises a plurality of pixel units which are restrictively constituted by the data lines and the scan lines; the pixel units comprise red pixel units, green pixel units, and blue pixel units.

The data welding lead-wires comprise a first data welding lead-wire set, a second data welding lead-wire set, and a third data welding lead-wire set; the data short lines comprise a first data short line, a second data short line, and a third data short line.

The first data welding lead-wire set is constituted by data welding lead-wires which are connected with the red pixel units, and all of the data welding lead-wires which are connected with the red pixel units electrically connect with each other by the first data short line.

The second data welding lead-wire set is constituted by data welding lead-wires which are connected with the green pixel units, and all of the data welding lead-wires which are connected with the green pixel units electrically connect with each other by the second data short line.

The third data welding lead-wire set is constituted by data welding lead-wires which are connected with the blue pixel units, and all of the data welding lead-wires which are connected with the blue pixel units electrically connect with each other by the third data short line.

In the liquid crystal display panel of the present invention, the pixel units further comprise white pixel units; the data short lines further comprise a fourth data short line; the data welding lead-wires further comprise a fourth data welding lead-wire set.

The fourth data welding lead-wire set is constituted by data welding lead-wires which are connected with the white pixel units, and all of the data welding lead-wires which are connected with the white pixel units electrically connect with each other by the fourth data short line.

In the liquid crystal display panel of the present invention, when the static-electricity-protection circuit is disposed between the data short lines and the common welding lead wires, at least one of the common welding lead-wires connects with the data short lines through the static-electricity-protection circuit.

The liquid crystal display panel of the present invention effectively prevents the damage of the metal lines caused by the static electrons by disposing the static-electron-protection circuit on the data short lines and the scan short lines extended out from the display region, which releases the static electrons to the common lines through the circuit, thereby decreasing the manufacturing cost.

DETAILED DESCRIPTION OF THE PREFERRED EMBODIMENTS

Figure 1:
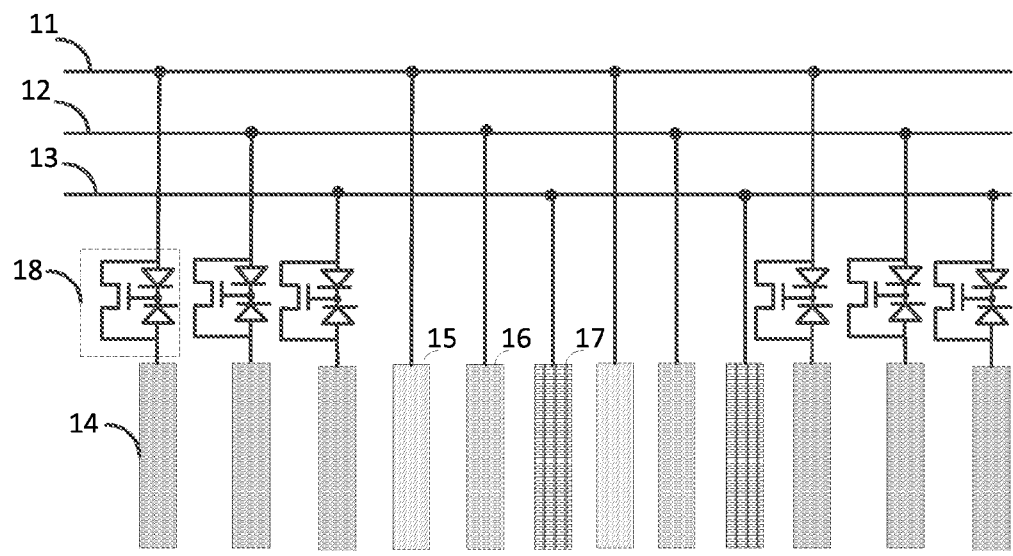
FIG. 1 is a first structure illustrative drawing of a static-electron-protection circuit of a first embodiment of the present invention.

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

The liquid crystal display panel of the present invention comprises a display region and a testing region. The display region is used to perform image display, and comprises:

A plurality of data lines, a plurality of scan lines, a plurality of common lines, and a plurality of pixel units. The data lines are used to input with data signals; the scan lines are used to input with scan signals; the pixel units are restrictively constituted by the data lines and the scan lines, the pixel units comprise red pixel units, green pixel units, and blue pixel units; the common lines are used to input common signals (common voltage), for example, the common lines connect with the ground during the liquid crystal display panel manufacturing process and connect with a constant voltage during the liquid crystal display panel displaying process.

The testing region is outside the display region, and is used to test the display region. The testing region comprises transmitting lines, testing lines, and a static-electron-protection circuit.

The transmitting lines comprise data welding lead-wires, scan welding lead-wires, and common welding lead-wires. The data welding lead-wires are used to transmit the data signals to the data lines, the scan welding lead-wires are used to transmit the scan signals to the scan lines, and the common welding lead-wires are used to transmit the common signals to the scan lines.

The testing lines comprise data short lines and scan short lines. The data welding lead wires are connected with the data short lines, the scan welding lead wires are connected with the scan short lines.

The static-electron-protection circuit is disposed between the testing lines and the common welding lead wires, the static-electricity-protection circuit is used to release the static electrons generated on the data lines or the scan lines through the common lines, when static electrons during the liquid crystal display manufacturing process of the data lines or the scan lines are generated.

The liquid crystal display panel of the present invention effectively prevents the damage of the metal lines caused by the static electrons by disposing the static-electron-protection circuit on the data short lines and the scan short lines extended out from the display region, in order to release the static electrons to the common lines through the circuit, thereby decreasing the manufacturing cost.

Please refer to FIG. 1, which is a first structure illustrative drawing of a static-electron-protection circuit according to a first embodiment of the present invention.

As shown in FIG. 1, the static-electron-protection circuit on one side of the data line is disposed outside of the liquid crystal display panel, the common welding lead-wires 14 are used to transmit the common signals to the common lines, and the data welding lead-wires 15-17 are used to transmit the data signals to the data lines.

All of the scan welding lead-wires comprise a first scan welding lead-wire set and a second scan welding lead-wire set, the scan short lines comprise a first scan short line and a second scan short line. The data short lines comprise a first data short line 11, a second data short line 12, and a third data short line 13.

The first data welding lead-wire set is constituted by data welding lead-wires 15 which are connected with the red pixel units R. All of the data welding lead-wires 15 connected with the red pixel units R electrically connect with each other by the first data short line 11.

The second data welding lead-wire set is constituted by data welding lead-wires 16, which are connected with the green pixel units G All of the data welding lead-wires 16, which are connected with the green pixel units G, electrically connect with each other by the second data short line 12.

The third data welding lead-wire set is constituted by data welding lead-wires 17, which are connected with the blue pixel units B. All of the data welding lead-wires 17, which are connected with the blue pixel units B, electrically connect with each other by the third data short line 13.

At least one of the common welding lead-wires 14 connects with the first data short line 11 through the static-electricity-protection circuit 18, preferably, the two sides of the first data short line 11 are respectively connected with one static-electricity-protection circuit, and the other side of both static-electricity-protection circuits is connected with one of the common welding lead-wires.

At least one of the common welding lead-wires 14 connects with the second data short line 12 through the static-electricity-protection circuit 18. Preferably, the two sides of the first data short line 12 are respectively connected with one static-electricity-protection circuit, and the other side of both static-electricity-protection circuits is connected with one of the common welding lead-wires.

At least one of the common welding lead-wires 14 connects with the third data short line 13 through the static-electricity-protection circuit 18. Preferably, the two sides of the third data short line 13 are respectively connected with one static-electricity-protection circuit, and the other side of both static-electricity-protection circuits is connected with one of the common welding lead-wires.

Preferably the data welding lead-wires further comprise a fourth data welding lead-wire set, and the data short lines further comprise a fourth data short line.

The fourth data welding lead-wire set is constituted by data welding lead-wires, which are connected with the white pixel units; and all of the data welding lead-wires, which are connected with the white pixel units, electrically connect with each other by the fourth data short line.

At least one of the common welding lead-wires 14 connects with the fourth data short line 14 through the static-electricity-protection circuit 18, preferably, the two sides of the fourth data short line 14 are respectively connected with one static-electricity-protection circuit, and the other side of both static-electricity-protection circuits is connected with one of the common welding lead-wires.

By disposing the static-electron-protection circuit on the data line lead-wires of every colors, the static electron releasing efficiency of the data lines is raised, and it is easy to discern the trouble circuit.

Figure 2:
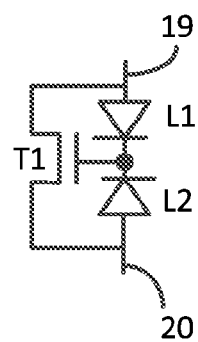
FIG. 2 is an enlarged drawing of the static-electron-protection circuit of the present invention.

FIG. 2 is an enlarged drawing of the static-electron-protection circuit of the present invention. The static-electricity-protection circuit 18 comprises a first input terminal 19 and a first output terminal 20. The first input terminal 19 inputs the static electrons generated on the data lines. The first output terminal 20 releases the static electrons generated on the data lines. The first input terminal 19 connects with one of the first data short line 11, the second data short line 12 and the third short line 13. The first output terminal 20 connects with the common welding common lead-wires 14.

The static-electricity-protection circuit 18 comprises a first diode L1, a second diode L2, and a transistor T1. The transistor T1 comprises a second input terminal, a second output terminal, and a control terminal.

An anode of the first diode L1 connects with the first input terminal, and a cathode of the first diode L1 connects with a cathode of the second diode L2.

An anode of the second diode L2 connects with the first output terminal.

The second input terminal of the transistor T1 connects with the anode of the first diode L1. The second output terminal of the transistor T1 connects with the anode of the second diode L2. The control terminal of the transistor T1 connects with the cathode of the first diode L1.

Preferably, when the data lines or the data short lines accumulate positive static electrons, the electrons flow to the control terminal of the transistor through the first diode, then the electrons are outputted to the common lines through the second output terminal of the transistor.

When the data lines or the data short lines accumulate negative static electrons, the electrons flow to the cathode of the second diode through the second input terminal and the control terminal of the transistor. Then, the electrons are outputted to the common lines through the anode of the second diode to effectively prevent the risk of the potential difference breaking through the data short lines or the data lines.

Preferably the data short lines are vertical with respect to the data welding lead-wires and the common welding lead-wires.

Figure 3:
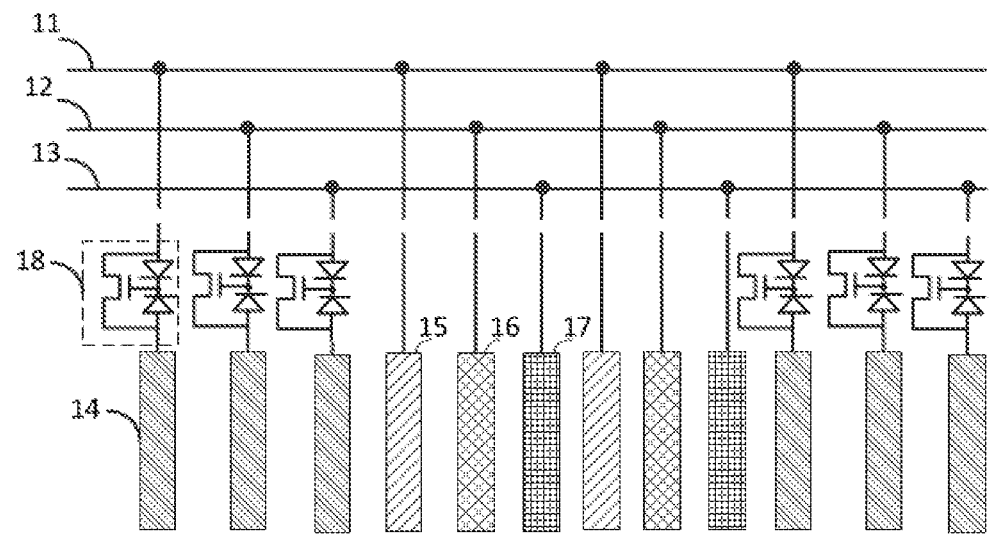
FIG. 3 is a second structural illustrative drawing of the static-electron-protection circuit of the first embodiment of the present invention.

After the manufacturing process is finished, as FIG. 3 shows, the static-electron-protection circuit 18 and the data short lines are cut by laser. The normal display of the display panel is not affected.

Figure 4:
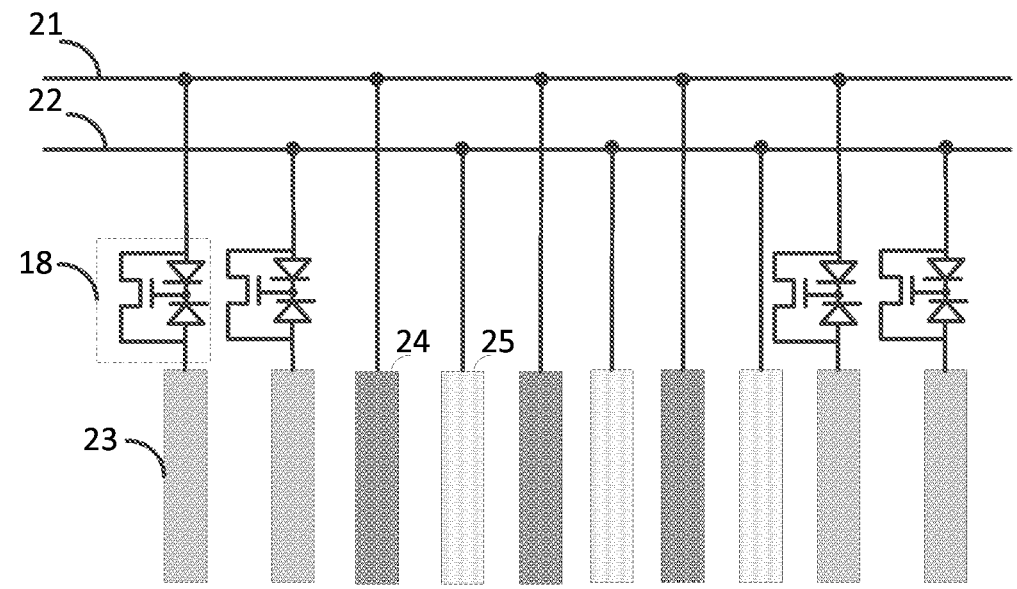
FIG. 4 is a first structural illustrative drawing of a static-electron-protection circuit of a second embodiment of the present invention.

Please refer to FIG. 4, which is a first structure illustrative drawing of a static-electron-protection circuit according to a second embodiment of the present invention.

As shown in FIG. 4, the static-electron-protection circuit on one side of the scan line is disposed outside of the liquid crystal display panel. The common welding lead-wires 23 are used to transmit the common signals to the common lines. The scan welding lead-wires 24 or 25 are used to transmit the scan signals to the scan lines.

All of the scan welding lead-wires comprise a first scan welding lead-wire set and a second scan welding lead-wire set. The scan short lines comprise a first scan short line and a second scan short line. The data short lines comprise a first data short line 21 and a second data short line 22.

The first scan welding lead-wire set is constituted by scan welding lead-wires 24 of (2K)th columns (even-numbered columns) or even rows, and the scan welding lead-wires 24 of (2K)th columns or even rows electrically are connected with each other by the first scan short line 21.

The second scan welding lead-wire set is constituted by scan welding lead-wires 25 of (2K+1)th columns (odd-numbered columns) or even rows, and the scan welding lead-wires 25 of (2K+1)th columns or odd rows electrically are connected with each other by the second scan short line 22. K is positive integer.

At least one of the common welding lead-wires 23 connects with the first scan short line 21 through the static-electricity-protection circuit 18, preferably, the two sides of the first scan short line 21 are respectively connected with one static-electricity-protection circuit 18, and the other side of both static-electricity-protection circuits is connected with one of the common welding lead-wires 23.

At least one of the common welding lead-wires 23 connects with the second scan short line 22 through the static-electricity-protection circuit 18, preferably, the two sides of the second scan short line 22 are respectively connected with one static-electricity-protection circuit 18, and the other side of both static-electricity-protection circuits is connected with one of the common welding lead-wires 23.

With the combination of FIG. 4 and FIG. 2, an enlarged illustrative drawing of the static-electron-protection circuit is disclosed.

The static-electricity-protection circuit 18 comprises a first input terminal 19 and a first output terminal 20. The first input terminal 19 inputs the static electrons generated on the scan lines. The first output terminal 20 releases the static electrons generated on the scan lines. The first input terminal 19 connects with one of the first scan short line 21 and the second scan short line 22. The first output terminal 20 connects with the common welding common lead-wires 24.

The static-electricity-protection circuit 18 comprises a first diode L1, a second diode L2, and a transistor T1. The transistor T1 comprises a second input terminal, a second output terminal, and a control terminal.

An anode of the first diode L1 connects with the first input terminal, and a cathode of the first diode L1 connects with a cathode of the second diode L2.

An anode of the second diode L2 connects with the first output terminal.

The second input terminal of the transistor T1 connects with the anode of the first diode L1. The second output terminal of the transistor T1 connects with the anode of the second diode L2. The control terminal of the transistor T1 connects with the cathode of the first diode L1.

Preferably when the scan lines or the scan short lines accumulate positive static electrons, the electrons flow to the control terminal of the transistor T1 through the first diode L1, then the electrons are outputted to the common lines through the second output terminal of the transistor T1.

When the scan lines or the scan short lines accumulate negative static electrons, the electrons flow to the cathode of the second diode L2 through the second input terminal and the control terminal of the transistor T1. Then, the electrons are outputted to the common lines through the anode of the second diode L2, to effectively prevent the risk of the potential difference breaking through the scan short lines or the scan lines.

Preferably the scan short lines are vertical with respect to the scan welding lead-wires and the common welding lead-wires.

Figure 5:
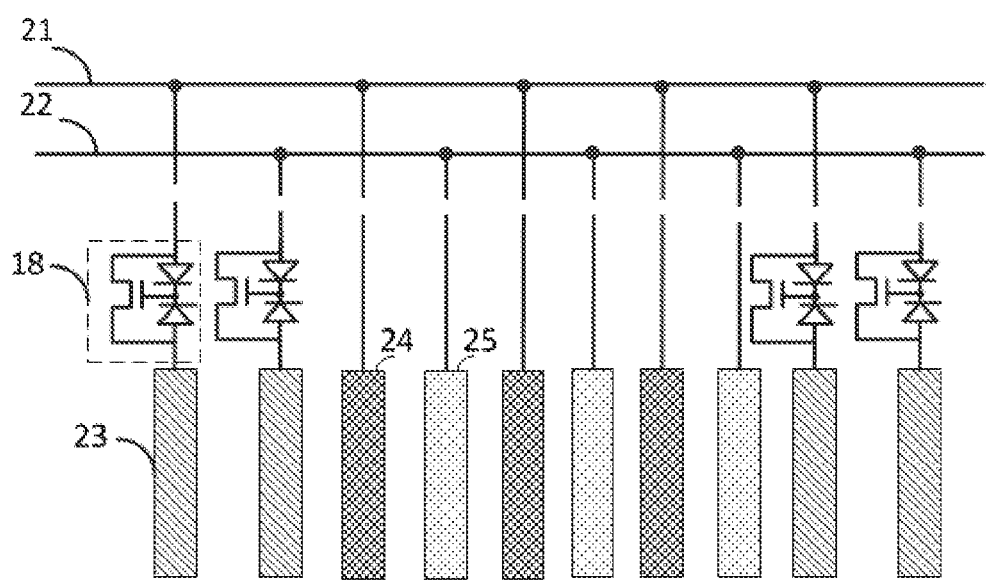
FIG. 5 is a second structural illustrative drawing of the static-electron-protection circuit of the second embodiment of the present invention.

After the manufacturing process is finished, as FIG. 5 shows the static-electron-protection circuit 18 and the scan short lines are cut by laser, the normal display of the display panel is not affected.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. A liquid crystal display panel, which comprising:
   a display region, used to perform image display, the display region comprising:
   a plurality of data lines, used to input with data signals;
   a plurality of scan lines, used to input with scan signals; and
   a plurality of common lines, used to input common signals;
   a testing region, used to test the display region, the testing region comprising:
   transmitting lines, which comprises a plurality of data welding lead-wires, a plurality of scan welding lead-wires, a plurality of common welding lead-wires; the data welding lead-wires being used to transmit the data signals to the data lines, the scan welding lead-wires being used to transmit the scan signals to the scan lines, the common welding lead-wires being used to transmit the common signals to the scan lines;
   testing lines, which comprise data short lines and scan short lines, the data welding lead wires being connected with the data short lines, the scan welding lead wires being connected with the scan short lines;
   a static-electron-protection circuit, disposed between the testing lines and the common welding lead wires, used to release the static electrons generated on the data lines or the scan lines through the common lines, when static electrons during the liquid crystal display manufacturing process of the data lines or the scan lines being generated;
   the static-electricity-protection circuit comprises a first input terminal and a first output terminal, the first input terminal inputs the static electrons generated on the data lines or the scan lines, the first output terminal releases the static electrons generated on the data lines or the scan lines, the first input terminal connects with the testing lines, the first output terminal connects with the common welding common lead-wires;
   when the static-electricity-protection circuit being disposed between the scan short lines and the common welding lead wires, at least one of the common welding lead-wires connect with the scan short lines through the static-electricity-protection circuit;
   wherein the static-electricity-protection circuit comprises a first diode, a second diode, and a transistor;
   wherein the transistor comprises a second input terminal, a second output terminal, and a control terminal;
   wherein an anode of the first diode connects with the first input terminal, and a cathode of the first diode connects with a cathode of the second diode;
   wherein an anode of the second diode connects with the first output terminal;
   wherein the second input terminal of the transistor connects with the anode of the first diode; the second output terminal of the transistor connects with the anode of the second diode; the control terminal of the transistor connects with the cathode of the first diode; and
   wherein when the data lines or the scan lines accumulate negative static electrons, the positive static electrons are released to the common lines by the second diode.

2. The liquid crystal display panel according to claim 1, wherein when the data lines or the scan lines accumulate positive static electrons, the positive static electrons are released to the common lines by the first diode.

3. The liquid crystal display panel according to claim 1, wherein:
   the scan welding lead-wires comprise a first scan welding lead-wire set and a second scan welding lead-wire set, the scan short lines comprise a first scan short line and a second scan short line;
   the first scan welding lead-wire set is constituted by scan welding lead-wires of (2K)th columns, the scan welding lead-wires of (2K)th columns electrically connect with each other by the first scan short line;
   the second scan welding lead-wire set is constituted by scan welding lead-wires of (2K+1)th columns, the scan welding lead-wires of (2K+1)th columns electrically connect with each other by the second scan short line, where K is a positive integer.

4. The liquid crystal display panel according to claim 1, wherein the liquid crystal display panel comprises a plurality of pixel units which are restrictively constituted by the data lines and the scan lines, the pixel units comprise red pixel units, green pixel units, and blue pixel units;
   the data welding lead-wires comprise a first data welding lead-wire set, a second data welding lead-wire set, and a third data welding lead-wire set; the data short lines comprise a first data short line, a second data short line, and a third data short line;

the first data welding lead-wire set is constituted by data welding lead-wires which are connected with the red pixel units, all of the data welding lead-wires which are connected with the red pixel units electrically connect with each other by the first data short line;

the second data welding lead-wire set is constituted by data welding lead-wires which are connected with the green pixel units, all of the data welding lead-wires which are connected with the green pixel units electrically connect with each other by the second data short line;

the third data welding lead-wire set is constituted by data welding lead-wires which are connected with the blue pixel units, all of the data welding lead-wires which are connected with the blue pixel units electrically connect with each other by the third data short line.

5. The liquid crystal display panel according to claim 4, wherein the pixel units further comprise white pixel units; the data short lines further comprise a fourth data short line; the data welding lead-wires further comprise a fourth data welding lead-wire set;

the fourth data welding lead-wire set is constituted by data welding lead-wires which are connected with the white pixel units, all of the data welding lead-wires which are connected with the white pixel units electrically connect with each other by the fourth data short line.

6. The liquid crystal display panel according to claim 1, wherein when the static-electricity-protection circuit is disposed between the data short lines and the common welding lead wires, at least one of the common welding lead-wires connects with the data short lines through the static-electricity-protection circuit.

7. A liquid crystal display (LCD) panel, which comprising:
a display region, used to perform image display, the display region comprising:
a plurality of data lines, used to input with data signals;
a plurality of scan lines, used to input with scan signals; and
a plurality of common lines, used to input common signals;
a testing region, used to test the display region, the testing region comprising:
transmitting lines, which comprise a plurality of data welding lead-wires, a plurality of scan welding lead-wires, and a plurality of common welding lead-wires; the data welding lead-wires being used to transmit the data signals to the data lines, the scan welding lead-wires being used to transmit the scan signals to the scan lines, the common welding lead-wires being used to transmit the common signals to the scan lines;
testing lines, which comprise data short lines and scan short lines, the data welding lead wires being connected with the data short lines, the scan welding lead wires being connected with the scan short lines;
a static-electron-protection circuit, being disposed between the testing lines and the common welding lead wires, the static-electricity-protection circuit being used to release the static electrons generated on the data lines or the scan lines through the common lines, when static electrons during the liquid crystal display manufacturing process of the data lines or the scan lines being generated;

wherein the static-electricity-protection circuit comprises a first input terminal and a first output terminal, the first input terminal inputs the static electrons generated on the data lines or the scan lines, the first output terminal releases the static electrons generated on the data lines or the scan lines, the first input terminal connects with the testing lines, and the first output terminal connects with the common welding common lead-wires;

wherein the static-electricity-protection circuit comprises a first diode, a second diode, and a transistor;

wherein the transistor comprises a second input terminal, a second output terminal, and a control terminal;

wherein an anode of the first diode connects with the first input terminal, and a cathode of the first diode connects with a cathode of the second diode;

wherein an anode of the second diode connects with the first output terminal;

wherein the second input terminal of the transistor connects with the anode of the first diode; the second output terminal of the transistor connects with the anode of the second diode; the control terminal of the transistor connects with the cathode of the first diode; and wherein when the data lines or the scan lines accumulate negative static electrons, the positive static electrons are released to the common lines by the second diode.

8. The liquid crystal display panel according to claim 7, wherein when the data lines or the scan lines accumulate positive static electrons, the positive static electrons are released to the common lines by the first diode.

9. The liquid crystal display panel according to claim 7, wherein:
the scan welding lead-wires comprise a first scan welding lead-wire set and a second scan welding lead-wire set, the scan short lines comprise a first scan short line and a second scan short line;
the first scan welding lead-wire set is constituted by scan welding lead-wires of (2K)th columns, the scan welding lead-wires of (2K)th columns electrically connect with each other by the first scan short line;
the second scan welding lead-wire set is constituted by scan welding lead-wires of (2K+1)th columns, the scan welding lead-wires of (2K+1)th columns electrically connect with each other by the second scan short line where K is a positive integer.

10. The liquid crystal display panel according to claim 7, wherein when the static-electricity-protection circuit is disposed between the scan short lines and the common welding lead wires, at least one of the common welding lead-wires connects with the scan short lines through the static-electricity-protection circuit.

11. The liquid crystal display panel according to claim 7, further comprising a plurality of pixel units which are restrictively constituted by the data lines and the scan lines, the pixel units comprise red pixel units, green pixel units, and blue pixel units;
the data welding lead-wires comprise a first data welding lead-wire set, a second data welding lead-wire set, and a third data welding lead-wire set; the data short lines comprise a first data short line, a second data short line, and a third data short line;
the first data welding lead-wire set is constituted by data welding lead-wires which are connected with the red pixel units, all of the data welding lead-wires which are connected with the red pixel units electrically connect with each other by the first data short line;

the second data welding lead-wire set is constituted by data welding lead-wires which are connected with the green pixel units, all of the data welding lead-wires which are connected with the green pixel units electrically connect with each other by the second data short line;

the third data welding lead-wire set is constituted by data welding lead-wires which are connected with the blue pixel units, all of the data welding lead-wires which are connected with the blue pixel units electrically connect with each other by the third data short line.

12. The liquid crystal display panel according to claim 11, wherein the pixel units further comprise white pixel units; the data short lines further comprise a fourth data short line; the data welding lead-wires further comprise a fourth data welding lead-wire set;

the fourth data welding lead-wire set is constituted by data welding lead-wires which are connected with the white pixel units, all of the data welding lead-wires which are connected with the white pixel units electrically connect with each other by the fourth data short line.

13. The liquid crystal display panel according to claim 7, wherein when the static-electricity-protection circuit is disposed between the data short lines and the common welding lead wires, at least one of the common welding lead-wires connects with the data short lines through the static-electricity-protection circuit.

\* \* \* \* \*